Oct. 29, 1935. W. T. BRADLEY 2,019,249
TRAY
Filed Oct. 23, 1934
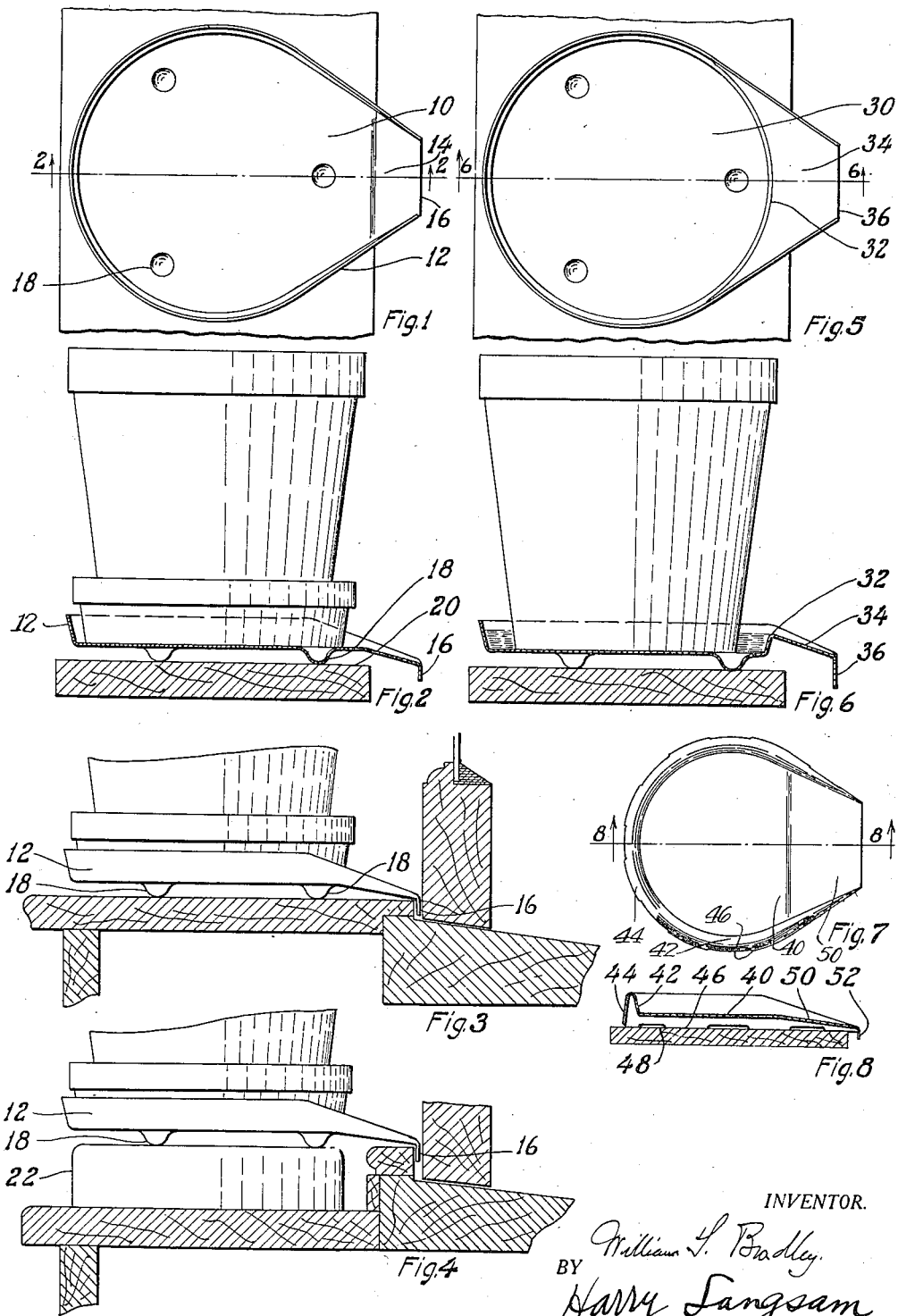
INVENTOR.
William T. Bradley
BY Harry Langsam
ATTORNEY.

Patented Oct. 29, 1935

2,019,249

UNITED STATES PATENT OFFICE 2,019,249

TRAY

William T. Bradley, Philadelphia, Pa.

Application October 23, 1934, Serial No. 749,531

7 Claims. (Cl. 47—36)

My invention relates to a receptacle particularly suited for holding a flower pot.

It is an object of my invention to utilize a tray or receptacle that will support a flower pot and which will direct the flow of excess liquid, used in the care of plants, to a predetermined drain where the liquid will not mar or damage articles adjacent to the tray which the liquid otherwise may engage when there is an overflow of liquid.

Another object of my invention is to provide a tray or receptacle that may be molded, stamped or cast as a single unit.

Another object of my invention is to construct a flower pot tray which is adapted to be placed indoors adjacent a window sill in order to readily discharge any excess fluid that may accumulate therein.

With the above objects in view, my invention is comprised of a tray or receptacle adapted to retain a flower pot having a ramp or spillway adjacent a portion of its side, the ramp serving to direct the discharge of any excess fluid.

Other objects of my invention are to provide an improved device of the character described, which is easily and economically produced, and which is sturdy and compact in construction.

With the above and related objects in view my invention consists in the details of construction as hereinafter shall be described, the description will be more readily understood when the description is read in conjunction with the accompanying drawing, in which:

Fig. 1 is a plan view of a tray embodying my invention.

Fig. 2 is a cross-sectional view taken on the line 2—2 of Fig. 1; however, the view illustrates a flower pot upon the tray and the tray resting upon a shelf or table.

Fig. 3 is a side elevational view of the tray embodying the present invention with a flower pot thereon and resting on a window sill.

Fig. 4 is a side elevational view of a tray embodying the present invention resting on a pad, and also showing a flower pot upon the tray; the pad is shown supported upon a window sill; the pad is used to elevate the tray so that the tray can be used conjointly with the window sill.

Fig. 5 is a plan view of a tray embodying the present improvements in a modified form, with the tray constructed to retain a portion of the water that may drain into it.

Fig. 6 is a sectional view taken on the line 6—6 of Fig. 5.

Fig. 7 is a plan view of a modification of my invention with the tray supported from the outside edge or rim.

Fig. 8 is a sectional view taken on the line 8—8 of Fig. 7.

Referring in greater detail to the drawing, I disclose a tray integrally united that may be formed of stamped metal, of cast metal, or molded of a phenolic condensation product such as products known by the trade-marks "bakelite" or "condensite."

In Figs. 1 and 2, I show a tray comprised of a substantially flat surface 10 wherein a portion of the marginal surface is inclined downwardly, as at 14, to serve as a guideway or spillway for excess liquid that may find its way into the tray from the flower pot. The guideway 14 has its tip or lip 16 formed substantially perpendicular to the plane of the base or flat portion 10 so that the lip 16 may be placed between a base of a movable window and a window sill to guide the excess liquid therebetween. The tip, also, may be placed adjacent any crevice, trough or surplus fluid receptacle that is adapted to receive superfluous liquid.

A plurality of projections or feet 18 are formed in the bottom of the tray to uniformly support the base portion 10 above a tray support 20 to permit the free circulation of air and to prevent the accumulation of moisture under the tray.

A pad 22, as shown in Fig. 4, is provided to elevate the tray where the construction of the window sill or supporting surface makes it necessary.

In the modification of my invention shown in Figs. 5 and 6, the base 30 has a peripheral flange 32 so that fluid may be retained by the tray. A portion of the flange merges with the spillway or guideway 34, and the tip 36 of the guideway is downturned to conduct the superfluous fluid into a crevice, trough or container that may be provided.

In another modification of my invention shown in Figs. 7 and 8, the outer marginal portion of a base 40 is partially extended upwardly, as at 42, and is then downturned as at 44. The free edge 46 of the margin 44, however, extends lower than the lowermost flat surface of the base 40, in order that the base 40 will be elevated from the surface upon which the edge 46 rests. Such arrangement permits the free circulation of air and prevents the accumulation of moisture upon the tray. A ramp or inclined spillway 50 and a lip 52 is likewise provided in this modification as in the above described modifications.

It is to be observed that in each of the modifications of my invention as illustrated in Figs. 2, 6 and 8, the tray may be readily stamped from a single sheet of metal, or the tray may easily be molded either from synthetic non-metallic products or from metallic products.

As frequently happens when flower pots or other receptacles are placed on sills, tables or shelves, the liquid that overflows, leaks, or drains upon the supporting surface mars that surface. With the arrangement hereinabove described, the excess water is conducted to the exterior of the dwelling or discharged into a trough or container that may be provided.

Although my invention has been described in considerable detail, such description is intended as illustrative rather than limiting, as the invention may be variously embodied, and the scope of the invention is to be determined as claimed.

I claim as my invention:—

1. A tray comprising a horizontally extending surface partly surrounded by an upwardly extended rim, one side of said rim and surface inclined downwardly thereby forming a spillway to allow the discharge of a fluid, and a lip on the end of said spillway to conduct said fluid into a crevice, trough, or receptacle.

2. A tray comprising a horizontally extending surface partly surrounded by an upwardly turned rim, a portion of said rim and said surface forming a guideway to allow the discharge of a fluid, and a pad to elevate said tray to a position whereby the liquid entering into the tray may be discharged from the said guideway.

3. A tray comprising a substantially flat horizontally extending surface partly surrounded by a rim, one side of said surface and rim depressed downwardly to allow the discharge of a fluid, and a plurality of downwardly extending legs or supports to space said tray in a horizontal position above a supporting surface.

4. A tray comprising a surface surrounded by an upwardly extended rim, a portion of said rim depressed and fitted with an outwardly and downwardly extending portion, and said outwardly and downwardly extending portion having a downwardly extending lip or fin arranged to conduct a fluid into a crevice, trough or receptacle.

5. A tray of unitary construction comprising a substantially flat base, a rim extending upwardly from the margin of said base, a downwardly inclined guideway for the passage of excess fluid, and a vertically extending lip at the edge of said guideway.

6. A tray of unitary construction comprising a horizontally extending base, a rim extending upwardly and then downwardly from said base, the downwardly extending portion of said rim having its free edge terminating beneath the lowermost surface of the horizontally extending base and forming a support for the tray as a whole, and a fluid guideway inclined downwardly from said base.

7. As an article of manufacture, a tray comprising a horizontally extending base, a portion of said base inclined downwardly thereby guiding the passage of excess fluid, a rim inclined upwardly on the periphery of said base, a portion of said rim inclined downwardly and defining the side walls of the inclined portion of the base, and the outer portion of said rim reversely bent and extending downwardly further than the lowermost portion of said base whereby the entire tray is supported by said rim.

WILLIAM T. BRADLEY.